March 17, 1931.  J. J. McMAHON  1,797,217
TANK VEHICLE
Original Filed March 2, 1929
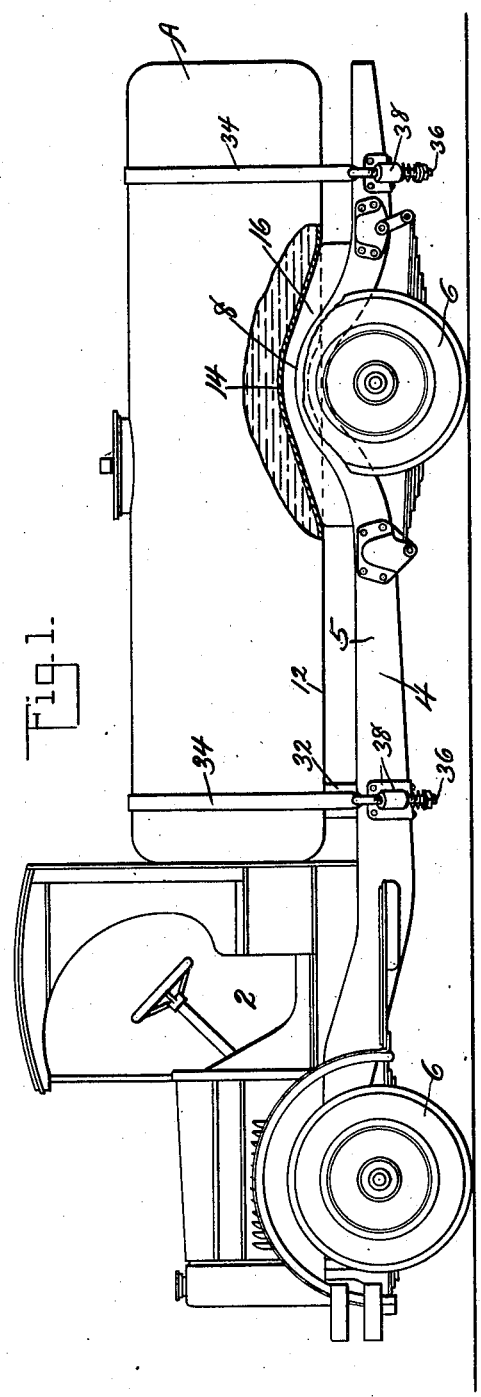
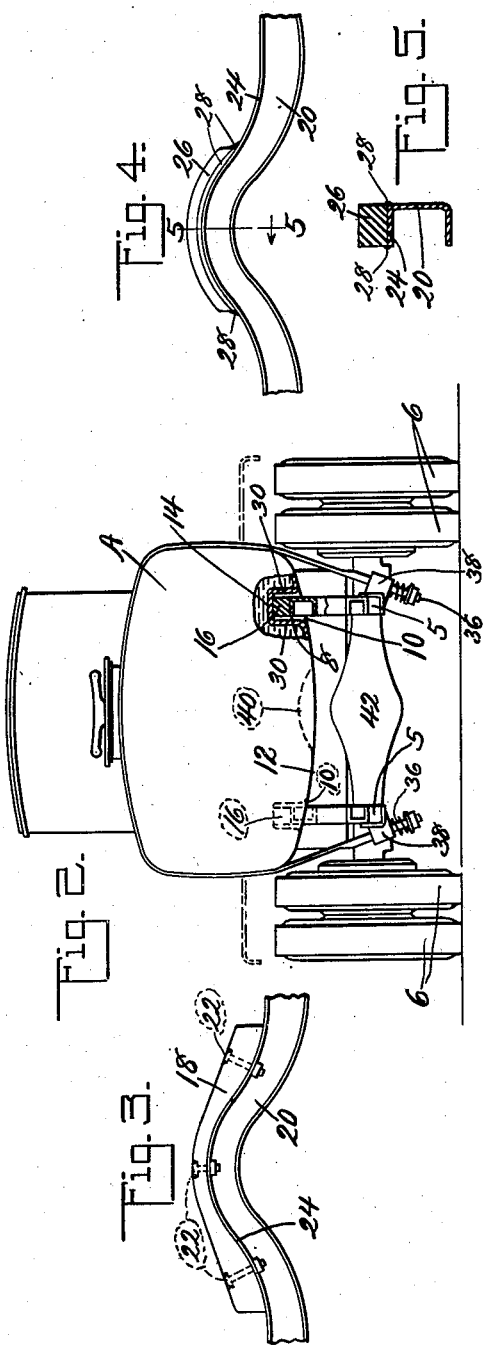
INVENTOR
James J. McMahon
BY J. H. Gibbs
ATTORNEY Patented Mar. 17, 1931

1,797,217

UNITED STATES PATENT OFFICE

JAMES J. McMAHON, OF FOREST HILLS, LONG ISLAND, NEW YORK, ASSIGNOR TO AMERICAN CAR AND FOUNDRY MOTORS COMPANY, OF NEW YORK, N. Y., A CORPORATION OF DELAWARE

TANK VEHICLE

Application filed March 2, 1929, Serial No. 344,011. Renewed January 27, 1931.

This invention relates to tank vehicles of the automobile type ordinarily employed in the transporting and vending of fuel oils, lubricating oils, gasoline or other fluid commodities, and has particular reference to the mounting or supporting of the tank on the chassis of the vehicle.

One object of the present invention is the provision of a means for supporting a tank in close proximity to the chassis.

Another object of the invention is the provision of a tank vehicle in which the provision of a superstructure for supporting the tank is eliminated, whereby to reduce the normal load of the vehicle.

A further object of the invention is the provision of a means for mounting a tank on a chassis of a motor vehicle in such a manner as to permit the easy removal therefrom when desired.

Other objects and advantages of this invention will be apparent from the following description taken in conjunction with the accompanying drawings in which:

Figure 1 is a side elevation of the tank vehicle, certain parts being shown in section and others broken away to disclose the tank mounting;

Fig. 2 is a rear end view of the tank vehicle of the present invention, certain parts being shown in section and others broken away;

Fig. 3 is a side elevation of a modification of the invention, the view showing a portion of the chassis;

Fig. 4 is a side elevation of a portion of the chassis showing still another modification of the invention; and Fig. 5 is a sectional view on the line 5—5, Fig. 4.

Referring now more particularly to the drawings, the vehicle includes a tank A, a driver's cab 2, a chassis 4, and wheels 6. In order to lower the horizontal position of the chassis, the side member 5 are provided adjacent their rear ends with upwardly extending arcuate portions 8 known at the present time as "kick-ups". These are arranged adjacent the rear wheels as clearly shown.

Heretofore it has been customary to build cradles, or other types of superstructures, on the chassis to accommodate a tank to be carried by the vehicle. Such superstructures or cradles not only add to the weight of the vehicle, but also increase the height or elevation of the tank carried thereby. With the present invention, superstructures are eliminated with the resultant lessening of the load, and, therefore, it is possible to employ tanks of greater capacity without increase in the weight of tank vehicles heretofore known and in which tanks the center of gravity will also be lower than the tank vehicles now in present use.

To effect the above result, the tank A is provided intermediate its ends, and more particularly at points directly over the "kick-ups" 8, with spaced longitudinally arranged recesses 10 formed by pressing the bottom 12 of the tank inwardly, as shown at 14. Referring now to Figs. 1 and 2, a supporting block 16 is positioned in each of the recesses 10, the upper and lower surfaces of the supporting block being formed to the contour of the recesses 10 and the "kick-ups" 8, respectively. In the form of the invention shown in Figs. 1 and 2, the blocks 16 are of metal and are preferably welded in the recesses.

In Fig. 3 the blocks have been shown as formed of wood, being designated at 18, and said blocks are bolted to the side members 20 of the chassis 4, the heads of the bolts being preferably countersunk in the blocks 18, as shown at 22, and said bolts extend through the upper chords 24 of the side members 20.

In the form shown in Fig. 4, the blocks have been designated as 26, and the same are welded to the upper chords 24 of the side members 20, as shown at 28, thereby firmly uniting the supporting blocks and the chassis. In the form of the invention shown in Figs. 3 and 4, it will be apparent that the tank may be readily removed from the chassis 4 and deposited wherever desired on its bottom 12 with the latter devoid of protruding elements.

In practice, the recesses 10 are preferably formed deep enough to permit the side members 20 to extend thereinto to prevent side sway of the tank under extreme conditions, it being obvious that any side sway which may develop will be limited by the walls 30 of said recesses.

The tank at its forward end is supported by a cradle 32 secured across the side members 5 of the chassis 4, and for tying the tank against vertical shifting straps 34 are provided which are arranged over the tank and have their ends connected to tie-bolts 36 resiliently carried in brackets 38 secured to the side members 5 of said chassis.

In view of the lowered position of the tank, it has been found advisable to provide the tank bottom 12 with a recess 40 arranged just over the differential bowl 42 of the rear axle housing to permit relative movement of the housing and tank without injuring the tank.

The construction shown in the present invention provides an arrangement in which the center of gravity of the tank is lowered and also provides a construction in which superstructures or heavy cradles are eliminated, thus reducing the normal load of the vehicle and permitting the employment of a larger tank with a consequent increase in amount of the tank lading. It has been found that the tank A is usually of such weight that it is not easily shifted on the chassis, and therefore no direct connection of the cradle 32 with the tank is necessary. It will be apparent that the tendency of endwise shifting, due to sudden stopping or starting of the vehicle, will be counteracted by the blocks arranged in the recesses 10.

The drawings disclose several forms of the present invention, but it is to be understood that these drawings are for illustrative purposes only and that various changes in the form and proportions of the invention may be made within the scope of the appended claims without departing from the spirit of the invention.

What is claimed is:

1. In a tank vehicle, chassis side members having upwardly extending arcuate portions adjacent the rear wheels of the vehicle, a tank having longitudinally arranged recesses formed in the bottom thereof, and means for supporting the tank on the chassis comprising supporting blocks arranged on the arcuate portions of said side member and extending into the recesses.

2. In a tank vehicle, chassis side members, a tank having longitudinally extending recesses formed in the bottom thereof, and tank supporting blocks secured to the side members and extending into the recesses, said blocks being free of attachment to the tank.

3. In a tank vehicle, chassis side members having upwardly extending arcuate portions intermediate their ends, a tank having oppositely arranged longitudinal recesses formed in the bottom of the tank and intermediate the ends thereof, and supporting blocks arranged in the recesses and seated on the said arcuate portions, said recesses being so formed that the side members extend thereinto.

4. In a tank vehicle, chassis side members having upwardly extending arcuate portions adjacent the rear wheels of the vehicle, a cradle secured across the side members, a tank having its forward end supported by the cradle and having spaced recesses formed in its bottom intermediate its ends and approximately over the arcuate portions of the side members, tank supporting blocks having their upper and lower surfaces conforming in contour to the arcuate portions of the side members and the tank recesses respectively, said blocks being supported by the said arcuate portions and supporting the tank in the recesses, and straps arranged over the tank and secured to said side members.

5. In a tank vehicle, chassis side members having kick-ups adjacent their rear ends, supporting blocks secured to said kick-ups, and a tank on said side members having spaced recesses in its bottom into which the blocks extend to support the tank intermediate its ends and to prevent longitudinal shifting, the bottom of said tank intermediate the recesses being arranged within the horizontal plane of the side members to prevent side sway of the tank, and means for supporting the front end of the tank on said chassis.

6. In a tank vehicle, chassis side members, a tank having recesses formed in the bottom thereof, and means for supporting the tank on the said side members comprising supporting blocks extended into the recesses and conformed to the shape thereof and supported by the said side members.

7. In a tank vehicle, chassis side members, a tank having recesses formed in the bottom thereof, and means for supporting the tank comprising supporting elements mounted on the said side members and arranged in the recesses; said tank seating on said supporting elements in the recesses.

8. In a tank vehicle, chassis side members, a tank having recesses formed therein, and means for supporting the tank comprising supporting elements mounted on the side members and extended into the recesses; said tank seating on the supporting elements in the recesses.

In witness whereof I have hereunto set my hand.

JAMES J. McMAHON.